United States Patent [19]
Zengerle et al.

[11] Patent Number: 6,000,676
[45] Date of Patent: Dec. 14, 1999

[54] MICROVALVE

[75] Inventors: Roland Zengerle, Villingen-Schwenningen; Johannes Wirtl, Schongau, both of Germany; Herbert Frisch, Vienna, Austria

[73] Assignee: Hygrama AG, Rotkreuz, Switzerland

[21] Appl. No.: 09/091,084
[22] PCT Filed: Dec. 11, 1996
[86] PCT No.: PCT/EP96/05543
   § 371 Date: Jan. 28, 1999
   § 102(e) Date: Jan. 28, 1999
[87] PCT Pub. No.: WO97/21930
   PCT Pub. Date: Jun. 19, 1997

[30] Foreign Application Priority Data
Dec. 11, 1995 [DE] Germany .......................... 195 46 181

[51] Int. Cl.⁶ .................................................. F16K 31/02
[52] U.S. Cl. ............... 251/129.06; 251/331; 251/129.01
[58] Field of Search .................. 251/129.06, 129.01, 251/331; 137/82

[56] References Cited

U.S. PATENT DOCUMENTS

| | | | |
|---|---|---|---|
| 4,585,209 | 4/1986 | Aine et al. .......................... | 251/129.09 |
| 4,654,676 | 3/1987 | Itano et al. .......................... | 346/140 R |
| 5,323,999 | 6/1994 | Bonne et al. .................. | 251/129.01 X |
| 5,333,831 | 8/1994 | Barth et al. .................... | 251/129.01 X |
| 5,400,824 | 3/1995 | Gschwendtner et al. ...... | 251/129.01 X |
| 5,785,295 | 7/1998 | Tsai ............................... | 251/129.01 X |
| 5,897,097 | 4/1999 | Biegelsen et al. ................. | 251/129.01 |

FOREIGN PATENT DOCUMENTS

| | | |
|---|---|---|
| 0435237A1 | 12/1990 | European Pat. Off. . |
| 0401607 | 12/1990 | Germany . |
| 4400315C1 | 12/1995 | Germany . |

*Primary Examiner*—John Rivell
*Assistant Examiner*—Meredith Schoenfeld
*Attorney, Agent, or Firm*—Dougherty & Associates

[57] ABSTRACT

A microvalve for controlling a fluid flow comprises a valve body provided with a valve opening having a sealing edge, and a valve plate provided with fluid openings. The valve plate is adapted to be moved perpendicularly to the valve body in such a way that, at a first position, said valve plate closes the valve opening, whereas, at a second position, it is perpendicularly spaced from said valve opening in such a way that a flow cross-section defined by said valve opening and said valve plate is decisively determined by the distance between the sealing edge and the valve plate. The contour of the sealing edge of the valve opening is chosen such that the length of the sealing edge exceeds the length of a sealing edge of a square valve opening which is equal in area.

12 Claims, 8 Drawing Sheets

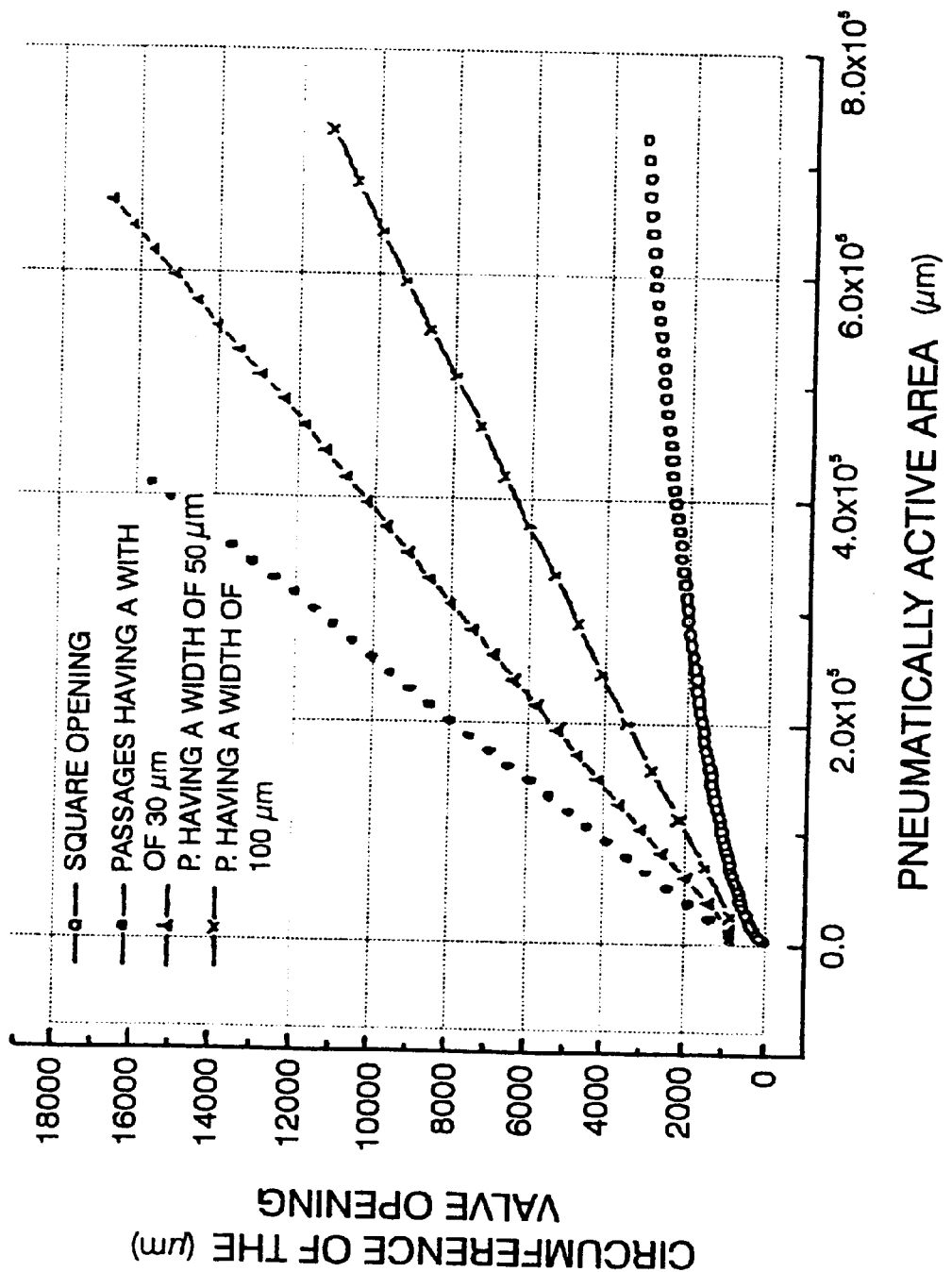

MICROVALVE

FIELD OF THE INVENTION

The present invention refers to valves for controlling fluid flows and especially to valves in which the distance between a valve plate and a valve opening is only very small.

DESCRIPTION OF THE PRIOR ART

A valve to which the present invention can be applied is e.g. an electrostatically driven microvalve of the type shown in FIG. 1. An electrostatically driven microvalve consists of a valve body 10 provided with a valve opening 12 and a valve plate 14 with fluid openings 16. The valve opening has typically a square shape, the square having a side length of 0.2 mm. The valve opening 12 is surrounded by a sealing edge 18 extending along the circumference of the valve opening 12. The sealing edge 18 can be formed e.g. by a raised portion along the circumference of the valve opening.

The valve plate 14 and the valve body 10 are arranged such that they are movable relative to one another in such a way that the valve opening 12 of the valve body 10 can be closed and opened by means of the valve plate 14. This arrangement can either be of such a nature that the valve body is arranged fixedly and the valve plate elastically or it can be of such a nature that the valve body is arranged elastically and the valve plate fixedly. In the example of a known electrostatically driven microvalve shown in FIG. 1, the valve plate 14 is secured to the valve body by means of a spacing layer 20 and has portions of reduced width 28 (cf. FIG. 2) therein. This has the effect that the central part of the valve plate 14 is elastically suspended relative to the valve body 10. In the voltage-free or pressureless condition, the valve plate 14 is located some micrometers (typically 5 micrometers) away from the valve body, and the valve opening 12 is consequently open. Such a valve is referred to as normally-open arrangement.

The valve body 10 and the valve plate 14 are enclosed in a housing 22. The housing has two openings 24a, 24b which can respectively serve as an inlet or as an outlet.

The valve is actuated by the application of an electric voltage U between the valve body and the valve plate. When this voltage is applied, charges flow onto the opposed sides of the two components. These charges attract each other, whereby the valve plate as a whole is moved towards the valve body. In order to prevent an electric short circuit when the valve plate 14 and the sealing edge 18 of the valve body 10 are in contact with each other, an insulating layer 26 (shown only for the valve plate 14) is applied to one component or to both components. In a valve for controlling fluid flows, the valve opening and the valve body must be surrounded completely by an insulating layer so as to insulate these two components.

Due to the electrostatic drive principle, such a microvalve shows a very small distance between the valve plate and the valve body. This small distance between the valve plate and the valve body limits the volumetric flow rate through the valve.

EP-A-0435237 discloses an electronic microvalve, the structural design of which aims at obtaining a minimized actuating voltage, a minimized actuating energy for the closing plate of the valve and good closing properties. This known microvalve has a square valve opening which is adapted to be closed by means of a closing plate that can be moved perpendicularly to the opening. For achieving the above-mentioned advantages, the known microvalve is formed of an integral structure.

SUMMARY OF THE INVENTION

It is a principal object of the present invention to provide a microvalve having an increased flow rate, without influencing the pressure dependence and the actuating voltage of said microvalve.

This object is achieved by a microvalve for controlling a fluid flow, said microvalve comprising:

a valve body provided with a valve opening having a sealing edge, and a valve plate provided with fluid openings, said valve plate being adapted to be moved perpendicularly to the valve body in such a way that, at a first position, said valve plate closes the valve opening, whereas, at a second position, it is perpendicularly spaced from said valve opening in such a way that a flow cross-section defined by said valve opening and said valve plate is decisively determined by the distance between the sealing edge and the valve plate, wherein the contour of the sealing edge of the valve opening is chosen such that the length of the sealing edge exceeds the length of a sealing edge of a square valve opening which is equal in area.

The contour of the sealing edge is preferably chosen such that the length of said sealing edge is at least twice as large as the length of the sealing edge of a square valve opening which is equal in area. This can be achieved by providing the contour of the sealing edge e.g. with meandrous folds. These meandrous folds result in the formation of inlet passages and outlet passages having a passage length and passage width whose dimensions determine the length of the sealing edge.

The microvalve can, for example, be an electrostatic valve or a pieoelectrically actuated valve. For improving the achievable volumetric flow rate still further, the fluid openings in the valve plate can be arranged essentially at the centre of said valve plate. For improving the switching time of the valve, the valve body and/or the valve plate can be provided with flow passages arranged in the opposed surfaces of said components.

BRIEF DESCRIPTION OF THE DRAWINGS

In the following, preferred embodiments of the present invention will be explained in detail making reference to the drawings enclosed, in which:

FIG. 5 shows a comparison between a square valve opening and valve openings according to the present invention with regard to the valve opening circumference and the pneumatically active area;

DESCRIPTION OF THE PREFERRED EMBODIMENTS

Prior to explaining preferred embodiments of the present invention in detail, the mode of operation of an electrostatically actuated microvalve, which constitutes the basis of the preferred embodiment of the present invention, will be explained in detail.

Figure 1:
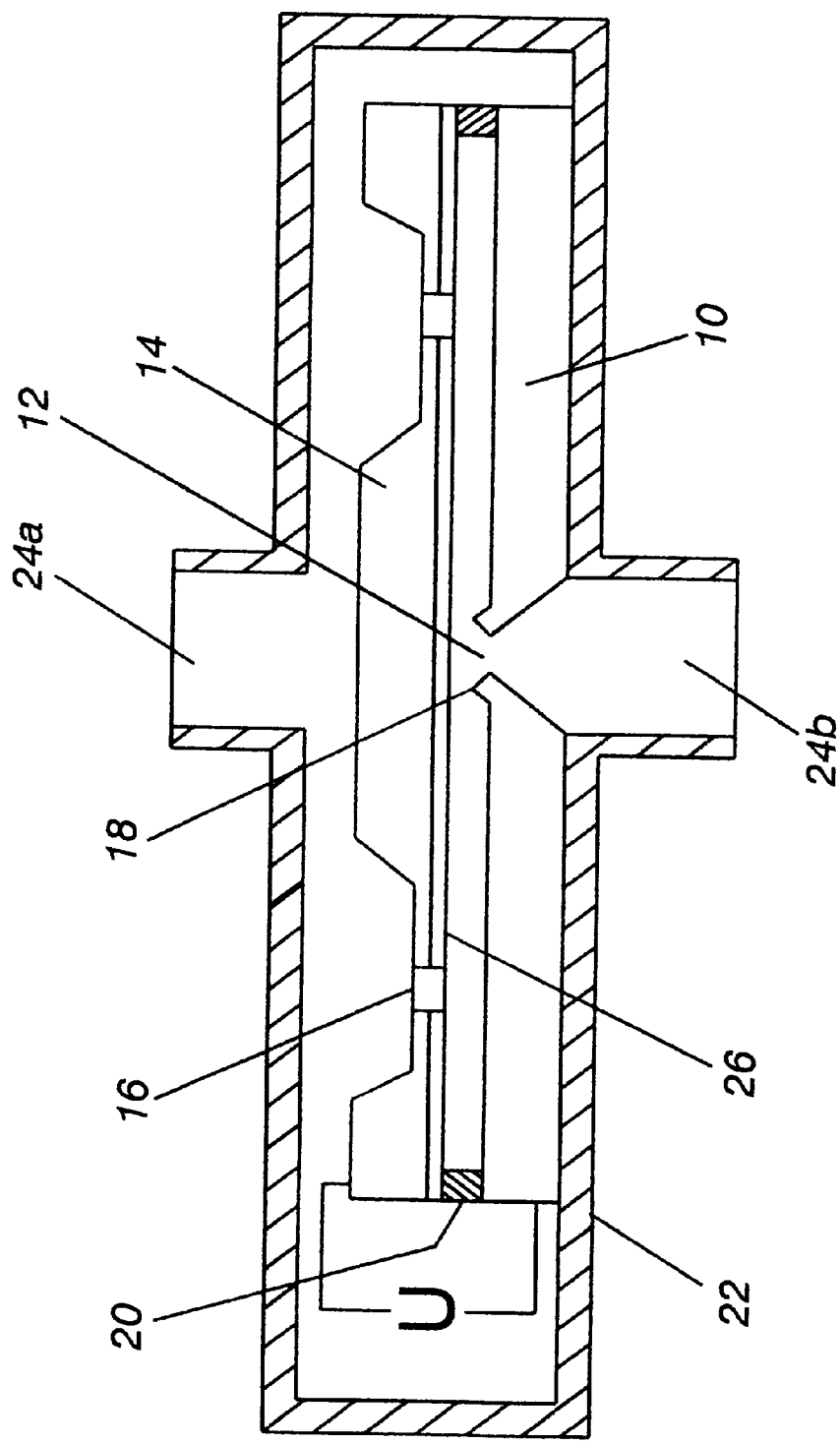
FIG. 1 shows a cross-section of a known electrostatic microvalve.
Figure 2:
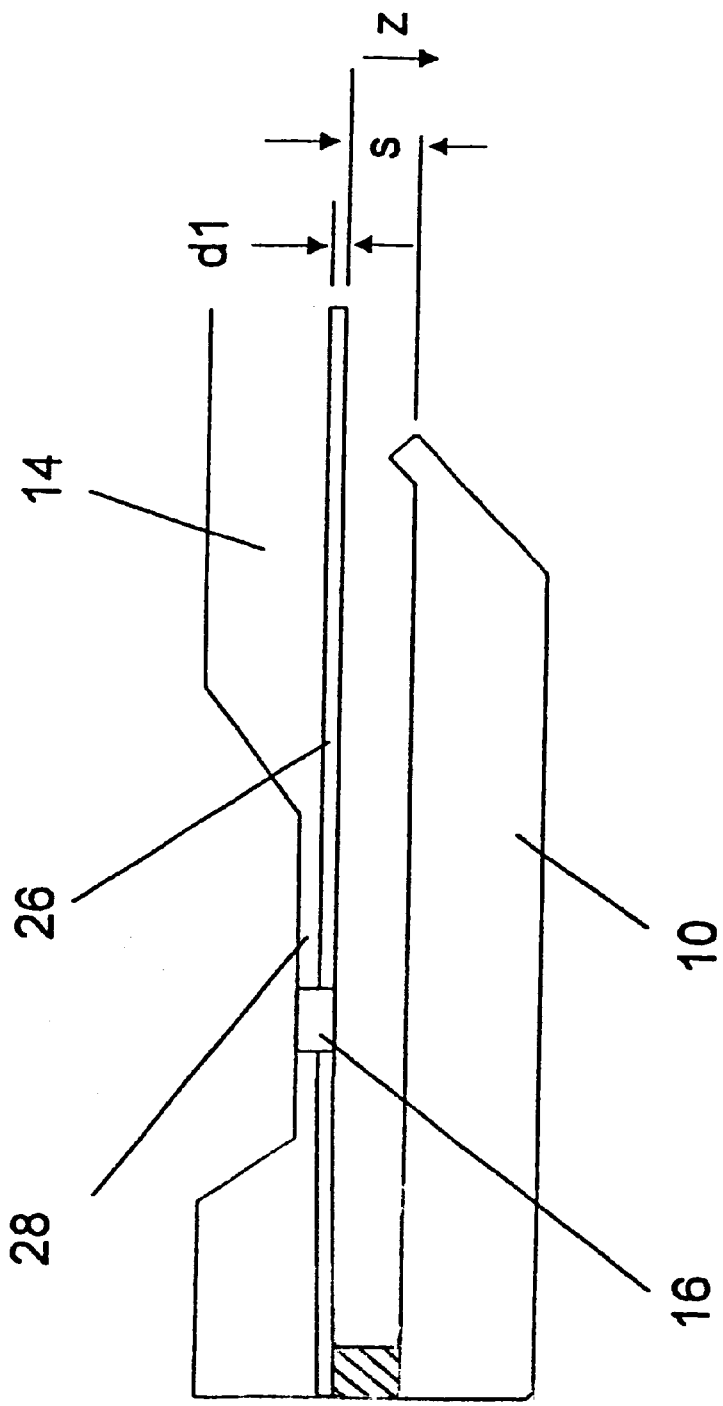
FIG. 2 shows a cross-sectional detail view of a microvalve for illustrating the dimensions of said microvalve.
Figure 3:
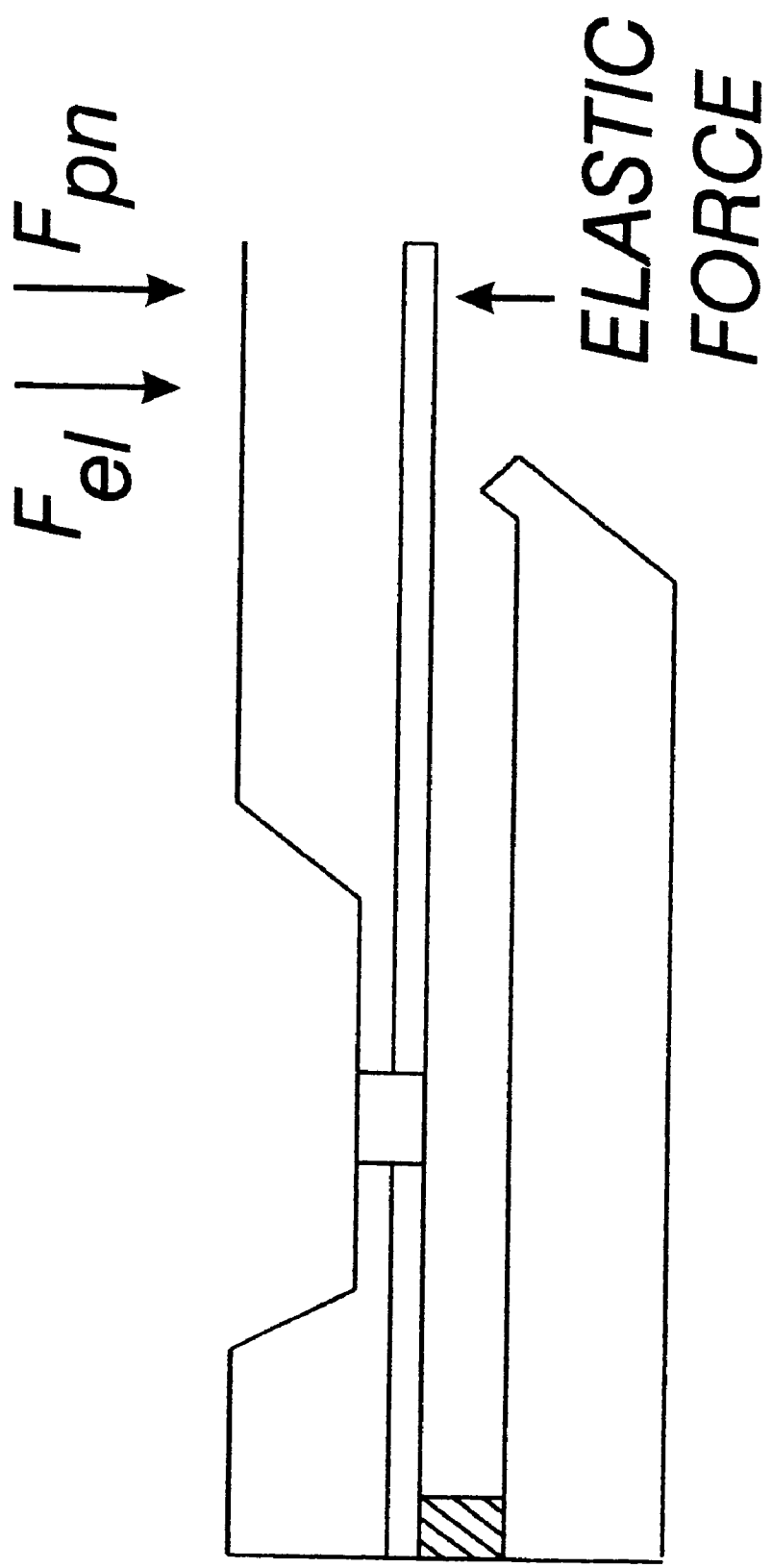
FIG. 3 shows a cross-sectional detail view for illustrating the balance of forces in the area of the valve opening of a microvalve.

FIG. 2 and 3 show sectional detail views of the microvalve of FIG. 1 for illustrating the mode of operation of said microvalve. In FIG. 2, the thickness d1 of the insulating layer 26 as well as the distance s of the valve body 10 from the insulating layer 26 are shown. FIG. 3 shows the electrostatic actuating force $F_{el}$ which is effective in direction z (FIG. 2), the pneumatic application force $F_{pn}$, and an elastic force produced by the spring force of the valve plate suspension.

The electrostatic actuating force $F_{el}$ is calculated according to the following equation:

$$F_{el}(z) = \frac{1}{2} \cdot \frac{\epsilon_0}{\epsilon_{gas}} \cdot A_{el} \cdot U^2 \cdot \frac{1}{\left(\frac{d_1}{\epsilon_1} + \frac{s}{\epsilon_{gas}}\right)^2} \quad (1)$$

Since the electrostatic actuating force $F_{el}$ increases linearly as the size of the electrode surfaces $A_{el}$ increases, as can be seen from equation (1), and since the operating voltage U for operating the valve should, simultaneously, be as low as possible, the valve plate is implemented such that it is clearly larger than the valve opening. Typical lateral dimensions are in the range of a few millimeters.

The variable $\epsilon_1$ indicates the dielectric constant of the insulating layer 26, $\epsilon_{gas}$ that of the fluid to be pumped, whereas $d_1$ indicates the thickness of the insulating layer, as has been mentioned hereinbefore.

In addition to this electrostatic actuating force, also pneumatic forces act on the valve plate, cf. FIG. 3. If it is assumed that the fluid flows from a location above the valve plate to a location below the valve body, a higher pneumatic pressure prevails on the side of the valve plate, and, consequently, also the pneumatic forces will have the tendency to close the valve. In order to keep the influence of the pneumatic pressure forces as small as possible, care is taken to ensure that the valve plate is pressure-balanced to a high degree. In this case, the pneumatic pressure only acts on the comparatively small area of the valve opening and, consequently, the pneumatic application force $F_{pn}$ is correspondingly small. The pneumatic application force $F_{pn}$ is the product of the application area $A_{pn}$ and the pressure difference between the pressures on both sides of the valve plate $p_e-p_a$.

$$F_{pn} = A_{pn} \times (p_e - p_a) \quad (2)$$

The distance between the valve plate and the valve body adjusts itself in accordance with the balance of forces which acts on the valve plate and which is shown in FIG. 3. The electrostatic and the pneumatic force produce a closing effect, whereas the spring force of the valve plate suspension, which represents an elastic force and which increases linearly as the deflection of the valve plate increases, produces an opening effect.

In such a microvalve, the location having the smallest flow cross-section limits the gas flow rate. The valve opening is typically a square having a side length of 0.2 mm, said side length resulting in a valve opening area of 0.04 mm². The product of the circumference of the valve opening and the distance to the valve plate is typically 4×0.2 mm×0.005 mm=0.004 mm², since the distance between the valve plate and the valve body is typically smaller than or equal to 5 µm. It follows that, in view of this small distance between the valve plate and the valve body, the gas flow rate through the valve is not determined by the area enclosed by the valve opening but by the circumference of said valve opening. The area enclosed by the valve opening influences, however, the pneumatic force acting on the valve plate and, consequently, the pressure dependence of the valve.

In order to increase the flow rate of a microvalve, it will therefore be necessary to increase the circumference of the valve seat without increasing simultaneously the area enclosed by the valve opening. For this purpose, a valve opening is required on the basis of which the area acted upon by the pneumatic forces is kept as mall as possible, whereas the circumference determining the flow rate is as large as possible.

Figure 4B:
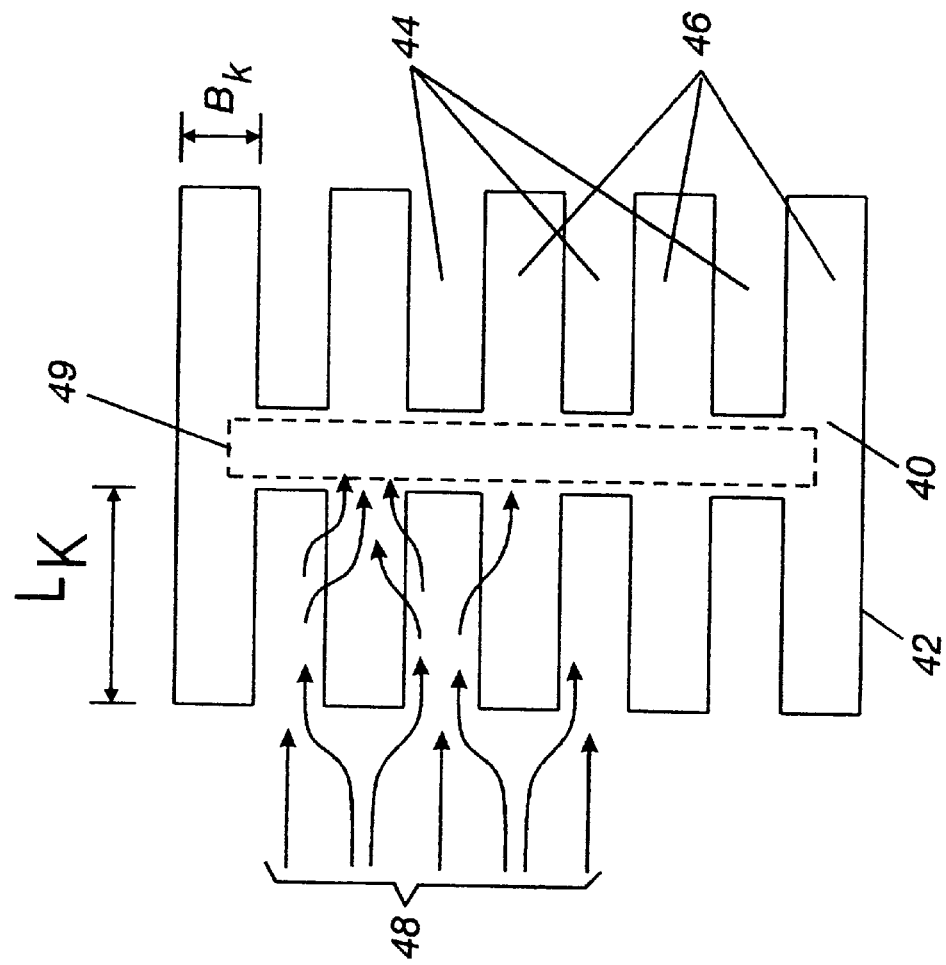
FIG. 4b shows a top view of a preferred embodiment of a valve opening according to the present invention.
Figure 4A:
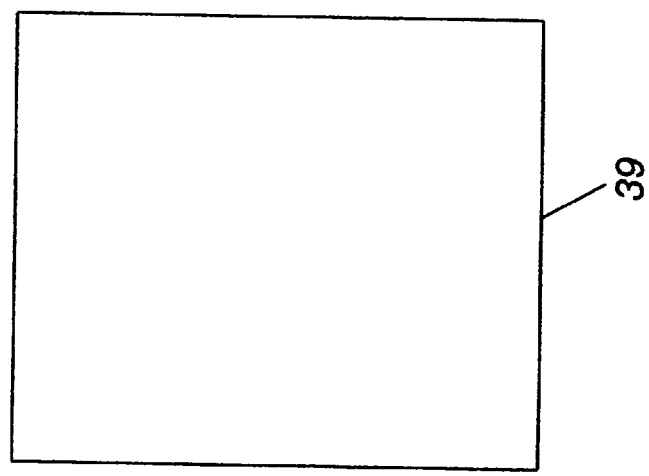
FIG. 4a shows a top view of a conventional valve opening.

A preferred embodiment of the valve opening according to the present invention is shown in FIG. 4b. In contrast to said FIG. 4b, FIG. 4a shows a conventional square configuration of a valve opening having a sealing edge 39. In the case of the valve opening 40 shown in FIG. 4b, the sealing edge 42 of the valve opening 40 is folded into a meandrous shape. This results in the formation of inlet passages 44 and outlet passages 46 for a fluid to be switched. The flow of a fluid is shown schematically by arrows 48 in FIG. 4b. The circumference of the valve opening, which determines the flow rate of the fluid, can be chosen by adjusting the passage length $L_K$ and the passage width $B_K$. The circumference of the valve opening increases as the width of the passages decreases. In FIG. 4b, the discharge opening 49 through the valve body is shown by a broken line.

A comparison between the conventional square opening geometry and the meandrous opening geometry of the valve opening according to the present invention with regard to valve opening circumference and pneumatically active area is shown in FIG. 5. In said FIG. 5, the circumference of the valve opening is plotted against the pneumatically active area. It can be seen that, in the case of the meandrous shape, the circumference increases much more strongly with the area than in the case of the square opening. The curves show that the smaller the passage width is, the stronger will be the increase in the circumference of the valve opening with the increasing active area.

The flow passages can be reduced in width until pressure losses occur in the flow passage due to the small width. By means of such an arrangement, the fluid flow through a microvalve can be increased by one order of magnitude.

It goes without saying that an increase in the circumference without a change in the opening area can also be achieved by other geometries. Suitable geometries are, for example, also trapezoidal or diamond-shaped folds.

Figure 6:
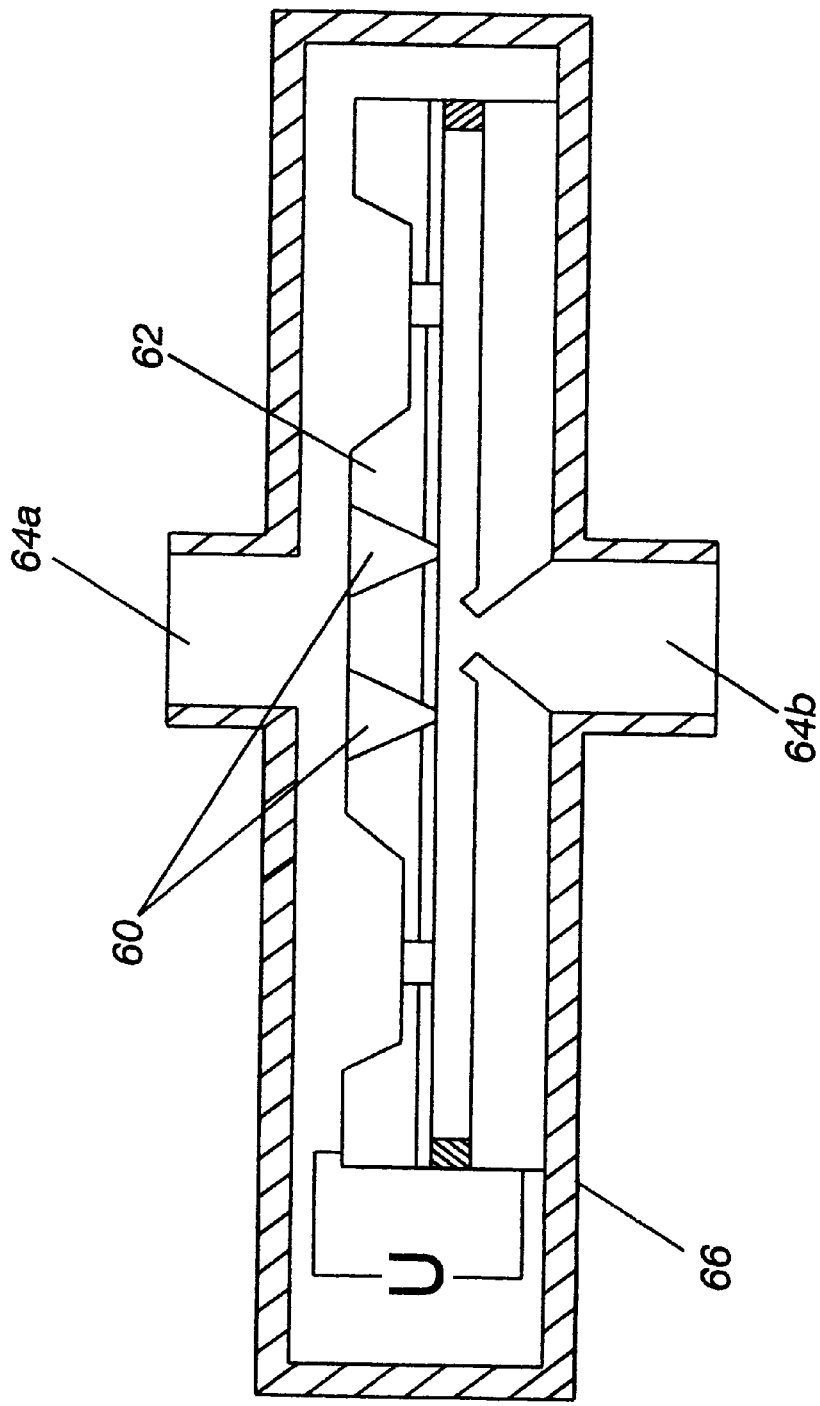
FIG. 6 shows an embodiment of the valve plate in a microvalve according to the present invention.

For reducing the flow resistance of a microvalve arrangement still further and for increasing the flow rate through the valve still further, additional supply openings can be arranged in the middle of the valve plate in addition to the fluid openings arranged in FIG. 1 in the area of the elastic suspension. This is shown in FIG. 6 by fluid openings 60 in a valve plate 62. The valve shown in FIG. 6 is again included in a housing 66 having inlet and outlet openings 64a, 64b. Due to the arrangement of the fluid openings 60 in the middle of the microvalve, it is not necessary that the fluid must flow in through the gap 68 between the valve plate and the valve body. As has been described hereinbefore, this gap is smaller than 5 µm due to the short range of the electrostatic forces. This would result in a disadvantageously high flow resistance for the fluid.

Figure 7:
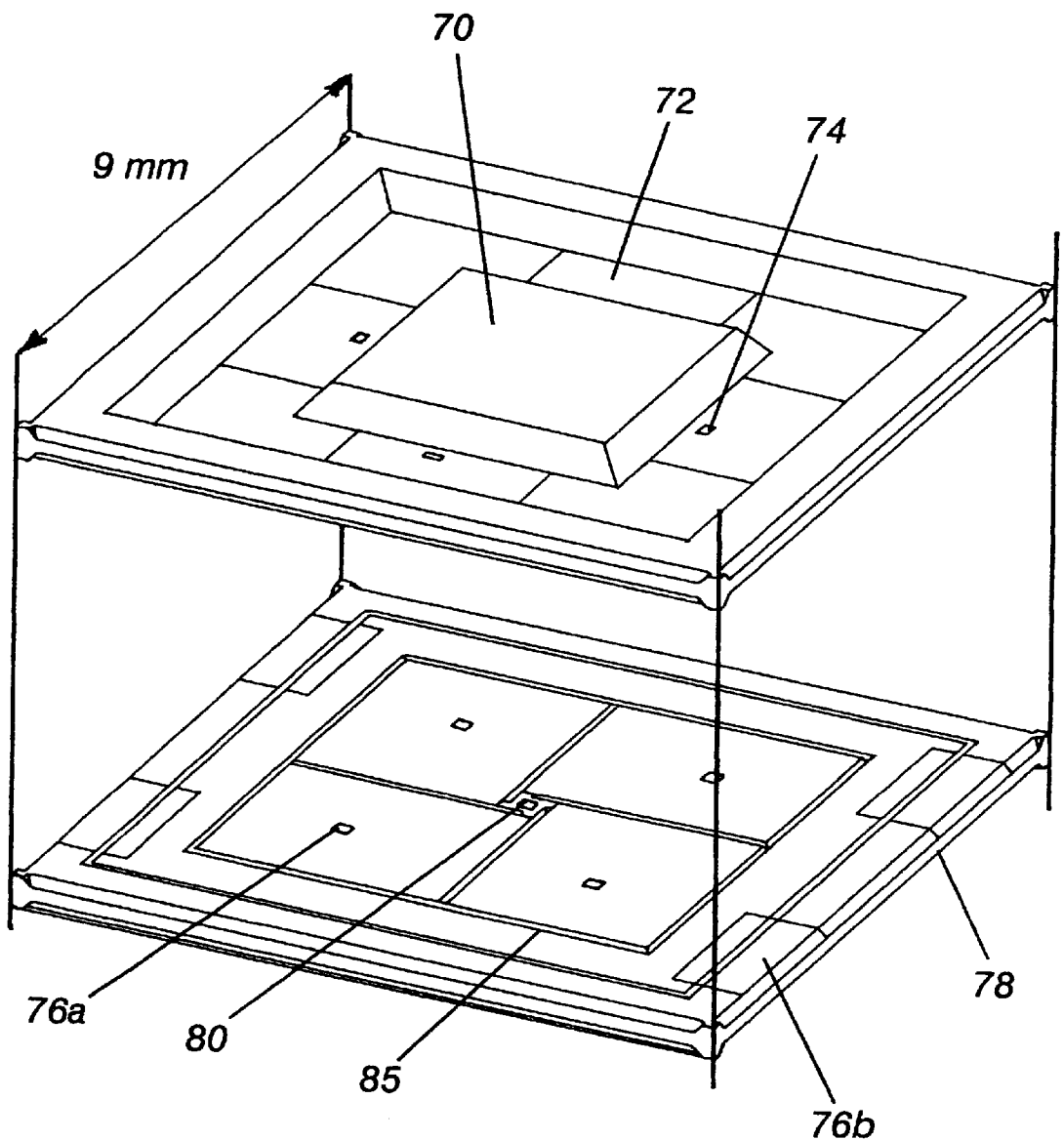
FIG. 7 shows an exploded view of a microvalve according to a further embodiment of the present invention.

FIG. 7 shows an exploded view of a further embodiment of the present invention. In this embodiment, a valve plate 70 is provided with elastic suspensions 72 which have arranged therein fluid openings 74. By means of spacing layers 76b, a valve base plate 78 is arranged in spaced relationship with the valve plate. The spacing layers can have a height of e.g. 5 µm. Furthermore, the valve base plate 78 has arranged thereon projections 76a, which prevent the valve plate from tilting in the closed condition. The projections 76a can have a height of e.g. 5 µm. At the centre of the valve base plate, a valve opening 80 is arranged, which is preferably implemented according to the geometry in FIG. 4b.

In view of the fact that the fluid must escape from the area between the valve plate and the valve body when a switching operation is taking place, the temporal behaviour of the switching operation will be strongly attenuated. By providing individual flow passages or a plurality of flow passages on the opposed surfaces of the valve body and/or of the valve plate, the fluid can be discharged more easily. This will substantially reduce the valve switching time.

Figure 8:
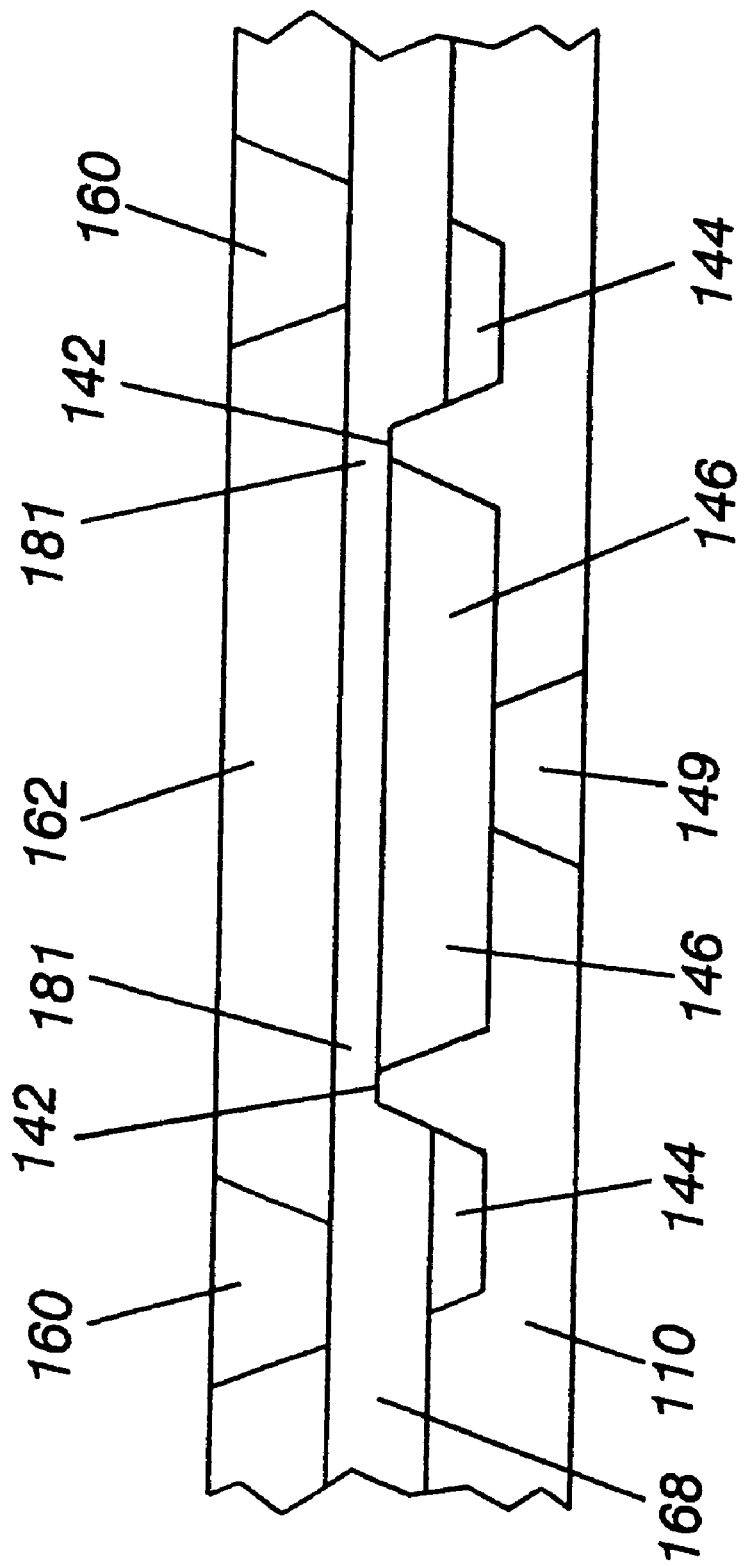
FIG. 8 shows a cross-sectional view of a further embodiment of a valve body and of a valve plate, which are adapted to be used in a microvalve according to the present invention.

In FIG. 8, a cross-sectional representation of a valve body 110 and of a valve plate 162 according to a further embodiment of the present invention is shown. A meandrous sealing lip 142 encompasses inlet passages 144 and outlet passages 146. If the gap 168 between the valve body 110 and the valve plate 162 has a similar size as the gap 181 between the sealing lip 142 and the valve plate 162, the meandrous shape of the sealing lip will not cause any substantial increase in flow, since the fluid flow through the valve is limited by the gap 168 as well as by the gap 181.

An increase in flow is obtained in cases in which the depth of the inlet passages 144 and of the outlet passages 146 is larger than the gap 181 between the sealing lip 142 and the valve plate 162. When the fluid flows along a path through the valve passages 160, through the inlet passages 146, through the gap 181 between the sealing lip 142 and the valve plate 162, through the outlet passages 146 and the discharge opening 149, it is only the gap 181 which causes a substantial limitation of the fluid flow. This embodiment will be advantageous especially in cases where e.g. for the efficacy of the electrostatic force, which is described in equation (1), the gap 168 between the valve body 110 and the valve plate 162 should be small.

It follows that the present invention provides a microvalve with a substantially increased flow rate, without increasing the pressure dependence or the actuating voltage of said microvalve. Furthermore, a microvalve having a shorter switching time can be realized by means of the present invention. It is also obvious that, alternatively to the embodiments described, a microvalve according to the present invention can also have a plurality of valve openings instead of a single valve opening.

We claim:

1. A microvalve for controlling a fluid flow, said microvalve comprising:
   a valve body provided with a valve opening having a sealing edge, and
   a valve plate provided with fluid openings, said valve plate being adapted to be moved perpendicularly to the valve body in such a way that, at a first position, said valve plate closes the valve opening, whereas, at a second position, it is perpendicularly spaced from said valve opening in such a way that a flow cross-section defined by said valve opening and said valve plate is decisively determined by the distance between the sealing edge and the valve plate,
   wherein the contour of the sealing edge of the valve opening is chosen such that the length of the sealing edge exceeds the length of a sealing edge of a square valve opening which is equal in area.

2. A microvalve according to claim 1, wherein the contour of the sealing edge is chosen such that the length of the sealing edge is at least twice as large as the length of the sealing edge of a square valve opening which is equal in area.

3. A microvalve according to claim 1, wherein the contour of the sealing edge is folded into a meandrous shape and defines inlet and outlet passages having a passage length and a passage width, the length of the sealing edge being determined by the passage length and the passage width.

4. A microvalve according to claim 1, wherein the contour of the sealing edge is folded into a trapezoidal shape.

5. A microvalve according to claim 1, wherein the contour of the sealing edge is folded into a diamond shape.

6. A microvalve according to claim 1, wherein the valve body is fixed, and that the valve plate is elastically suspended.

7. A microvalve according to claim 1, wherein the sealing edge consists of a raised portion along the circumference of the valve opening.

8. A microvalve according to claim 1, wherein the microvalve is an electrostatic valve.

9. A microvalve according to claim 1, wherein the microvalve is a piezoelectrically actuated valve.

10. A microvalve according to claim 1, further comprising additional fluid openings arranged in the valve plate essentially at the centre thereof.

11. A microvalve according to claim 1, wherein the valve body is provided with flow passages which are arranged in the surface located opposite the valve plate.

12. A microvalve according to claim 1, wherein the valve plate is provided with flow passages which are arranged in the surface located opposite the valve body.

* * * * *